United States Patent [19]
Hetrick

[11] 3,946,201
[45] Mar. 23, 1976

[54] TEMPERATURE LIMITING WATTAGE CONTROL FOR A CERAMIC COOKING PLATFORM

[75] Inventor: George L. Hetrick, Mansfield, Ohio
[73] Assignee: White-Westinghouse Corporation, Cleveland, Ohio
[22] Filed: Feb. 27, 1975
[21] Appl. No.: 553,847

[52] U.S. Cl. .............. 219/511; 219/490; 219/492; 219/507
[51] Int. Cl.² .......................................... H05B 1/02
[58] Field of Search .......... 219/443, 448, 457, 504, 219/505, 509, 511, 490, 494, 492, 236, 317

[56] References Cited
UNITED STATES PATENTS

| | | |
|---|---|---|
| 2,628,034 | 2/1953 | Ray ........................... 337/107 UX |
| 2,919,337 | 12/1959 | Brosseau et al. ............... 219/494 X |
| 3,005,896 | 10/1961 | Whinery ........................... 219/492 |
| 3,077,529 | 2/1963 | Schauer ........................... 219/494 |

Primary Examiner—J. D. Miller
Assistant Examiner—Fred E. Bell
Attorney, Agent, or Firm—McNenny, Farrington, Pearne & Gordon

[57] ABSTRACT

A sensor, located to respond to the temperature of the cooking platform and having a positive temperature coefficient of resistance throughout a range of temperatures up to the maximum selected safe operating temperature of the platform, is connected to a thermal cycling control switch and provides an increasing resistance with an increasing platform temperature to effect a wattage limiting control of the heating element supplying heat to the platform.

4 Claims, 3 Drawing Figures

TEMPERATURE LIMITING WATTAGE CONTROL FOR A CERAMIC COOKING PLATFORM

BACKGROUND OF THE INVENTION

1. Field of the Invention

The invention pertains to the art of limiting glass-ceramic cooking platform temperatures through limiting the wattage supplied to the heater associated with the platform.

2. Description of the Prior Art

U.S. Pat. No. 3,798,416 discloses a temperature control system stated to provide relatively economical temperature control using solid-state components and which is stated to be especially suitable for use with the electrically heated glass-ceramic cook-tops and providing temperature limiting of both the electric heating element and the cook-top. This patent also refers to prior art temperature control systems of other than the solid-state type. This patent is mentioned mainly because it shows one arrangement for obtaining temperature control for a glass cook-top but in a form considered to be relatively expensive as compared to my arrangement.

U.S. Pat. No. 3,005,896 discloses an arrangement for temperature control of a cooking vessel in which a positive temperature coefficient of resistance sensor is associated with a heater for a bimetal to obtain the control. While the arrangement there shown has superficial similarities to my invention, it differs in a number of ways including being a full range temperature control as distinguished from a wattage limiting control which is capable only of limiting the rate of input to the heater element in a direction to limit the temperature of a glass cook-top. Because the last noted patent arrangement is for the purpose of obtaining full range temperature control, it is substantially more complicated than an arrangement according to my invention. Finally, and most importantly, the patented arrangement would not be capable of functioning as a temperature limiting control for a cooking platform since its temperature range as disclosed is coupled to the temperature range of the cooking vessel, which is very substantially less than the temperature which the glass-ceramic cooking platform will achieve in normal operation. Thus a typical nickel or nickel alloy of the type used as the sensor in such an application has a temperature coefficient of resistance which changes from positive to negative in a range between about 900°F. and 1100°F (482°C and 593°C). Such a temperature sensor would cause a runaway if applied to limit a glass platform temperature since the glass platform temperature will at times, be in the neighborhood of 1300°F (704°C) or higher.

SUMMARY OF THE INVENTION

An adequate summary of the invention is considered to be expressed in the Abstract of the Disclosure.

DRAWING DESCRIPTION

DESCRIPTION OF THE PREFERRED EMBODIMENT

Figure 1:
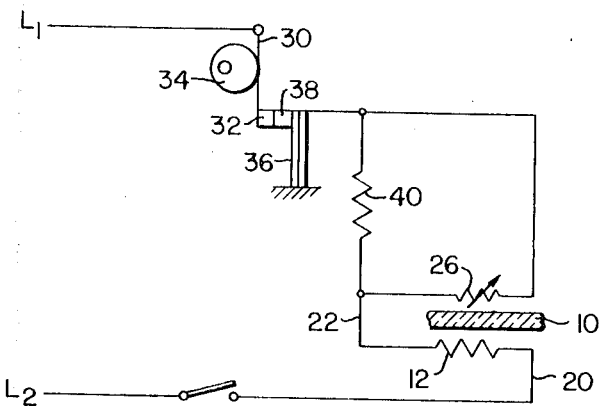
FIG. 1 is a schematic view of a circuit incorporating the invention.
Figure 2:
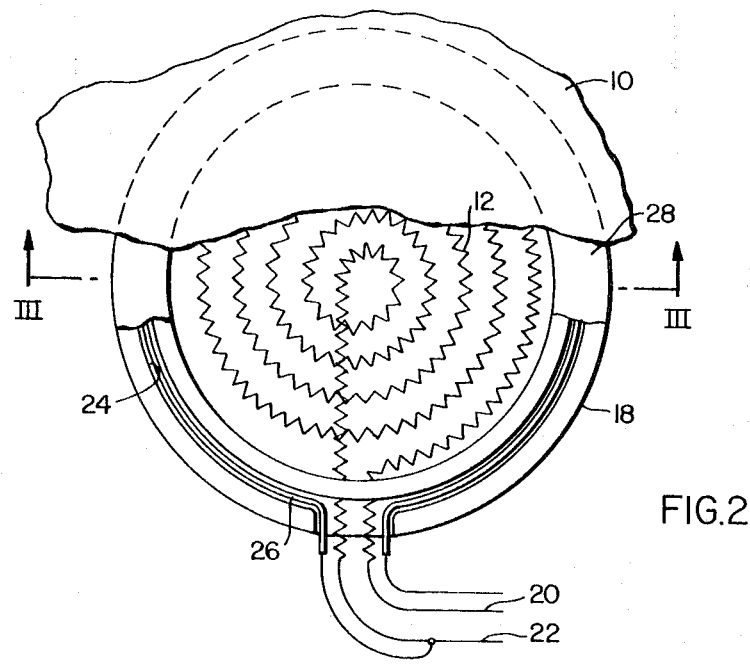
FIG. 2 is a partly broken top view of a glass cooking platform and underlying heater assembly.
Figure 3:
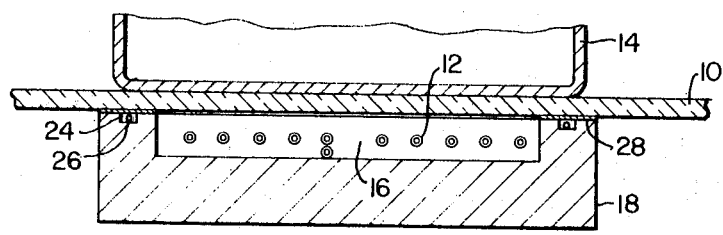
FIG. 3 is a vertical sectional view corresponding to one taken along the line III—III of FIG. 2.

The environment in which the invention finds its most suitable application is in connection with a glass-ceramic cook-top platform 10 having an underlying heating element 12 which heats the platform. The heated platform in turn supplies heat to a cooking vessel 14 supported on the platform. The heater 12 (FIGS. 2 and 3) is supported at the bottom of a recess 16 in a support block 18 molded of alumina-silica. The heater 12 is typically a helically wound, open coil arranged in a spiral in the recess 16. The terminal ends of the heater exit through the side of the block 18 and are identified by the numerals 20 and 22 in FIGS. 1 and 2.

The upper rim of the block has a groove 24 (FIGS. 2 and 3) extending around it, with a sensor wire 26 lying in the groove. A ring 28 of high temperature fiber paper overlies the rim of the mold and the groove 24 and is sandwiched between the rim and the platform 10 when the mold 18 is supported in its final position closely underlying the platform 10. Thus the sensor wire 26 is physically located to sense the temperature of the platform 10 near the heater.

The material of the sensor wire 26 has a positive temperature coefficient of resistance throughout a range of temperatures up to the maximum selected safe operating temperature of the platform 10. A nickel-cobalt alloy of the type disclosed in U.S. Pat. No. 3,454,748 is a suitable material for constructing the sensor wire 26. In this connection it is noted that while most nickel and nickel alloys have a temperature coefficient of resistance which changes from positive to negative between about 900° to 1100°F the cobalt-nickel wire of the patent has a relatively linear resistance curve portion up to about 1800°F (982°C). For many of the glass platforms 10 it is desirable to limit the temperature to around 1300°F (704°C) although it is believed that improved platforms capable of withstanding 1500°F (816°C) may be available soon. In either event, the noted material is satisfactory for use as a sensor wire.

Limiting the temperature of the glass cook-top 10 is most important under conditions of a high heat setting and in the absence of a load such as the vessel 14 receiving heat from the cook-top. In the preferred mode of the invention, it is considered desirable to provide a temperature limiting wattage control giving a reduction in the heater 12 wattage of about 50% so that in a stable condition with no load and at a maximum temperature setting the heater 12 wattage will be reduced to about 50% of its maximum wattage.

The control arrangement includes a temperature control component in the form of a thermal cycling switch of the general type disclosed in U.S. Pat. No. 3,634,802. The essential parts of the thermal cycling switch of particular interest in its application in this invention are the user-adjusted spring arm 30 carrying contact 32, and being adjustable by cam 34, main bimetal 36, carrying its cycling contact 38 at one end for making and breaking with contact 32, and the bimetal resistance heater 40. The noted elements of the thermal cycling switch are basically conventional and details as to their construction may be had by reference to the noted patent. The bimetal heater 40 is connected between the cycling contact 38 and the one side of the main heater 12 so that it is in series with the main heater 12. The sensor wire 26 is connected in parallel with the bimetal heater 40 as shown in the FIG. 1 circuit.

The thermal cycling switch operates in the conventional way with the bimetal deflecting, upon heating, in a direction toward opening the cycling contacts and, upon cooling, moving back toward a closed contact position.

While the connection between the sensor wire 26 and the cycling contact 38 is shown as being around the bimetal other than through it, the connection can be made through the bimetal 36 so long as the bimetal has a sufficiently low resistance as to provide negligible heating of the bimetal by the current passing through it.

The resistances of the bimetal heater 40 and the sensor wire 26 are chosen so that the input range for the thermal cycling switch, depending on the switch setting, is the same as a standard, unbiased thermal cycling switch when the heater 12 is at normal room temperature. As the heater 12 heats up on energization and thereby heats the platform and sensor wire 26, the positive temperature coefficient of resistance of the sensor wire results in its increased resistance. This causes less current to bypass the bimetal heater 40 which thereby increases the heating of the bimetal and reduces the percent On time of the thermal cycling switch which runs at a percent On time inversely proportional to the instantaneous wattage in the bimetal heater 40. Thus the arrangement offers a rapid preheat when the heater 12 starts out cold, a negative feedback which cannot turn the heater 12 off entirely, and thus a steady state wattage input on the average responding to the setting of the thermal cycling switch.

The heater 12 wattage is determined by the maximum allowable temperature on the glass 10 and the condition of a steady state turndown of about 50%. Thus with the thermal cycling switch set at its high heat position it will call for 100% On time with the heater 12 and sensor 26 at room temperature; but when the system is stabilized either with or without a cooking load, it will deliver only about one-half of the full wattage of heater 12 and that saturated condition will produce a temperature of the glass no higher than its selected safe temperature such as 1300°F (704°C).

Among the advantages of the invention is that while a pure temperature control, where the input responds to temperature, will not control a boil operation satisfactorily, a temperature limiting wattage control as herein disclosed will control the boil rate with a potential temperature limiting effect at any setting. Additionally, the arrangement is extremely simple and of moderate cost in that the conventional type thermal cycling switch presently used with such glass cook-tops may be used and requires only that a low resistance shunt wire around the bimetal heater 40 and an additional terminal be provided. The arrangement also permits the sensor wire 26 to be located peripherally of the heater 12 (FIGS. 2 and 3) rather than in a central location between the heater and glass as is commonly now done with expanding rod controls.

I claim as my invention:

1. A temperature limiting wattage control for a cooking platform which is itself heated by an underlying main heating element to supply heat for transfer to a cooking vessel supported on the platform, comprising:
    a thermal cycling, user-operated control switch including a bimetal carrying a cycling contact and a heater associated with the bimetal for controlling the position of said bimetal and cycling contact, said bimetal heater being connected in series between said cycling contact and one side of said main heater; and
    a sensor having a positive temperature coefficient of resistance throughout a range of temperatures up to the maximum selected safe operating temperature of said platform, said sensor being electrically connected to said one side of said main heater and in parallel with said bimetal heater, and located to respond to the heat of said cooking platform to provide an increasing resistance with an increasing platform temperature.

2. A control according to claim 1 wherein:
    said sensor comprises a cobalt-nickel alloy.

3. A control according to claim 1 wherein:
    said sensor comprises a cobalt-nickel alloy wire arranged peripherally of said main heating element.

4. A temperature limiting wattage control for a glass-ceramic cooking platform having a main heating element underlying the platform, comprising:
    a thermal cycling, user-operated control switch including a bimetal carrying a cycling contact and a bimetal heater associated with the bimetal for controlling the positioning of said bimetal and cycling contact;
    a resistance wire sensor element having a positive temperature coefficient of resistance throughout a range of temperatures up to the maximum selected safe operating temperature of said platform, said sensor being connected in parallel with said bimetal heater and in series with said main heating element and responsive to the glass platform temperature to provide an increasing resistance with an increasing platform temperature and thereby shunting additional current through said bimetal heater to provide increasing quantities of heat to said bimetal and decreasing On times of said thermal cycling switch.

* * * * *